UNITED STATES PATENT OFFICE 2,392,649

TRIAZINE DERIVATIVES

Gaetano F. D'Alelio and James W. Underwood, Pittsfield, Mass., assignors to General Electric Company, a corporation of New York No Drawing. Application July 30, 1942, Serial No. 452,891

15 Claims. (Cl. 260—249.5)

This invention relates to the production of new chemical compounds and more particularly to triazine derivatives. The invention especially is concerned with the production of new and useful arylsulfonylhydrazino- and haloarylsulfonylhydrazino-substituted triazines.

The chemical compounds of this invention may be represented by the following general formula:

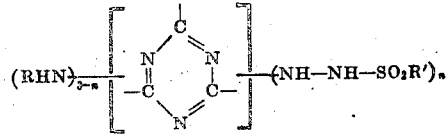

where $n$ represents an integer and is at least 1 and not more than 3, R represents a member of the class consisting of hydrogen and monovalent hydrocarbon and substituted hydrocarbon radicals, more particularly halo-hydrocarbon radicals, and R' represents a member of the class consisting of aryl radicals and substituted aryl radicals, more particularly halo-aryl radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2 - butenylphenyl, tertiary - butylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, iodophenyl, fluorophenyl, bromotolyl, etc.

Illustrative examples of aryl and substituted aryl radicals that R' in Formula I may represent are: phenyl, diphenyl, naphthyl, anthracyl, tolyl, xylyl, ethylphenyl, propylphenyl, isopropylphenyl, allylphenyl, 2 - butenylphenyl, tertiary - butylphenyl, methylnaphthyl, ethylnaphthyl, iodophenyl, chlorophenyl, bromophenyl, fluorophenyl, chlorotolyl, bromotolyl, chloroxylyl, dichlorophenyl, iodotolyl, propenylphenyl, etc.

Preferably R in Formula I is hydrogen and $n$ represents 1. The general formula for such a compound is:

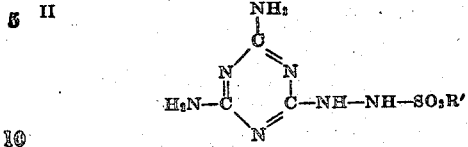

Preferably R' in Formulas I and II is either a phenyl radical or a tolyl radical.

The new compounds of this invention may be used, for example, as plasticizers and as intermediates in the preparation of derivatives thereof, e. g., methylol, methylene, etc., derivatives of the individual compound embraced by Formula I. These new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. Such condensation products are more fully described and are specifically claimed in our copending application Serial No. 452,890, filed concurrently herewith and assigned to the same assignee as the present invention.

Various methods may be employed to produce the chemical compounds of this invention. We prefer to prepare them by effecting reaction, in the presence of a hydrohalide acceptor, between a hydrazino-substituted s-triazine and an aryl sulfonyl chloride, bromide or iodide, preferably an aryl sulfonyl chloride or bromide.

Illustrative examples of hydrazino triazines that may be employed, depending upon the particular end-product sought, are:

Hydrazino diamino s-triazine
Hydrazino di(methylamino) s-triazine
Hydrazino di-(ethylamino) s-triazine
Hydrazino di-(propylamino) s-triazine
Tri-(hydrazino) s-triazine
Monoamino di-(hydrazino) s-triazine [amino di-(hydrazino) s-triazine]
Mono-(methylamino) di-(hydrazino) s-triazine
Mono-(ethylamino) di-(hydrazino) s-triazine
Mono-(butylamino) di-(hydrazino) s-triazine
Mono-(allylamino) di-(hydrazino) s-triazine
Mono-(cyclohexylamino) di-(hydrazino) s-triazine
2-hydrazino 4-methylamino 6-amino s-triazine
2-hydrazino 4-ethylamino 6-amino s-triazine 2-hydrazino 4-methylamino 6-ethylamino s-triazine
Hydrazino di-(pentylamino) s-triazine
Hydrazino di-(isobutylamino) s-triazine
Hydrazino di-(propenylamino) s-triazine
Hydrazino di-(butenylamino) s-triazine
Hydrazino dianilino s-triazine
  (Monohydrazino dianilino s-triazine)
Monoanilino di-(hydrazino) s-triazine
  [Anilino di-(hydrazino) s-triazine]
Mono-(pentylamino) di-(hydrazino) s-triazine
Mono-(chloroanilino) di-(hydrazino) s-triazine
Mono-(bromotoluido) di-(hydrazino) s-triazine
Mono-(chloroethylamino) di-(hydrazino) s-triazine
2-hydrazino 4-anilino 6-amino s-triazine
2-hydrazino 4-anilino 6-methylamino s-triazine
Hydrazino ditoluido s-triazine
Hydrazino dixylidino s-triazine
Hydrazino di-(naphthylamino) s-triazine
Hydrazino di-(ethylanilino) s-triazine
Mono-(cyclohexenylamino) di-(hydrazino) s-triazine
Hydrazino di-(phenethylamino) s-triazine
Hydrazino di-(cinnamylamino) s-triazine
Hydrazino di-(chloromethylamino) s-triazine
Hydrazino di-(bromoethylamino) s-triazine
Hydrazino di-(chloroanilino) s-triazine
Hydrazino di-(bromotoluido) s-triazine
Hydrazino di-(fluoroanilino) s-triazine
Hydrazino di-(iodotoluido) s-triazine
Mono-(octylamino) di-hydrazino) s-triazine
Mono-(benzylamino) di-(hydrazino) s-triazine Illustrative examples of mono- and poly-aryl sulfonyl halides that may be used, depending upon the desired end-product, are:

Benzene sulfonyl chloride
Benzene sulfonyl bromide
Benzene sulfonyl iodide
Toluene sulfonyl chloride
Toluene sulfonyl bromide
Xylene sulfonyl chloride
Ethylbenzene sulfonyl chloride
Propylbenzene sulfonyl chloride
Isobutylbenzene sulfonyl chloride
Propenylbenzene sulfonyl chloride
Diethyl benzene sulfonyl chloride
Methyl ethyl benzene sulfonyl chloride
Naphthalene sulfonyl chloride
Anthracene sulfonyl chloride
Chlorobenzene sulfonyl chloride
Chlorobenzene sulfonyl bromide
Bromobenzene sulfonyl chloride
Dichlorobenzene sulfonyl chloride
Bromotoluene sulfonyl chloride
Chloroxylene sulfonyl chloride Various hydrohalide acceptors may be employed, the chosen acceptor depending largely upon the particular solvent used. We prefer to use as the hydrohalide acceptor a tertiary base, e. g., trialkyl amines such as trimethyl amine, triethyl amine, tributyl amine, etc., triaryl amines such as triphenyl amine, tritolyl amine, etc., dialkyl aryl amines, e. g., dimethyl aniline, etc., pyridine, quinoline, etc.

The reaction between the hydrazino-substituted s-triazine and the aryl sulfonyl halide may be carried out in any suitable manner but preferably is effected in the presence of a suitable anhydrous solvent or mixture of solvents, e. g., ether, benzene, toluene, etc. The choice of the solvent depends largely upon economic considerations and upon the solubility of the starting reactants. The reaction may be carried out at normal, sub-normal or at elevated temperatures and at atmospheric, sub-atmospheric or super-atmospheric pressures. We prefer to carry out the reaction at normal temperatures and pressures.

The above reaction may be represented by the following general equation:

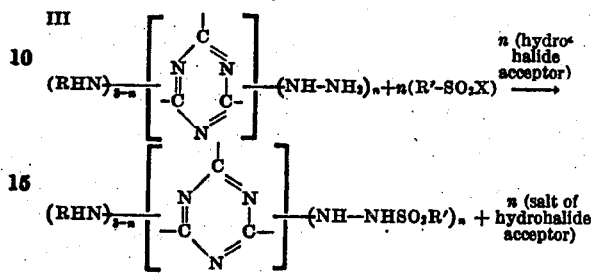

In the above equation X represents a halogen selected from the class consisting of chlorine, bromine and iodine, and $n$, R and R' have the same meanings as given above with reference to Formula I.

In order that those skilled in the art better may understand how the present invention may be carried into effect, the following examples are given by way of illustration and not by way of limitation. All parts are by weight.

*Example 1*

This example illustrates the preparation of (benzene sulfonyl hydrazino) diamino s-triazine, the formula for which is

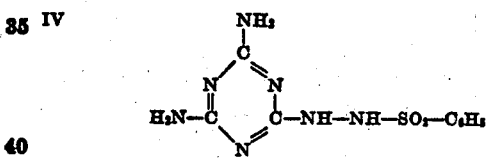

|  | Parts | Approx. molar ratios |
|---|---|---|
| Hydrazino diamino s-triazine | 100.0 | 1 |
| Benzene sulfonyl chloride | 125.0 | 1 |
| Pyridine | 56.1 | 1 |
| Ether | 1,000.0 |  |

The benzene sulfonyl chloride was dissolved in the ether and the resulting solution then was added slowly to the mixture of the other components while stirring vigorously and cooling. After standing for 1 hour at room temperature, the reaction mass was shaken for 4 hours at that temperature. After standing for 65 hours at room temperature the precipitate comprising (benzene sulfonyl hydrazino) diamino s-triazine was filtered off, washed with ether and dried. A yield of 184 parts of the purified product was obtained.

*Example 2*

(Benzene sulfonyl hydrazino) di-(methylamino) s-triazine is prepared in essentially the same manner as described under Example I with the exception that, instead of hydrazino diamino s-triazine, an equivalent amount of hydrazino di-(methylamino) s-triazine is employed.

*Example 3*

(Toluene sulfonyl hydrazino) diamino s-triazine is prepared in essentially the same manner as described under Example 1 with the exception that, instead of benzene sulfonyl chloride, an equivalent amount of toluene sulfonyl chloride is used.

As it will be readily understood by those skilled in the art, when it is desired to produce compounds containing a single amino (—NHR) grouping and two arylsulfonylhydrazino or haloarylsulfonylhydrazino groupings attached to the triazine nucleus or a compound containing three arylsulfonylhydrazino or haloarylsulfonylhydrazino groupings attached to the triazine nucleus, then the starting reactants and proportions of reactants are chosen so as to yield the desired products in accordance with methods such as above given by way of illustration. For example, in the preparation of monoamino di-(benzene sulfonyl hydrazino) s-triazine there is used monoamino di-(hydrazino) s-triazine in an equivalent amount to that shown in Example 1 with reference to hydrazino diamino s-triazine, and benzene sulfonyl chloride and pyridine in twice the amounts there mentioned. Similarly, in the preparation of tri-(benzene sulfonyl hydrazino) s-triazine there is used tri-(hydrazino) s-triazine in an equivalent amount to that shown in Example 1 with reference to hydrazino diamino s-triazine, and benzene sulfonyl chloride and pyridine in three times the amounts there mentioned.

Other examples of chemical compounds embraced by Formula I that may be produced in accordance with the present invention are listed below:

(Benzene sulfonyl hydrazino) di-(ethylamino) s-triazine
2-(benzene sulfonyl hydrazino) 4-methylamino 6-amino s-triazine
2-(benzene sulfonyl hydrazino) 4-anilino 6-amino s-triazine
2-(benzene sulfonyl hydrazino) 4-anilino 6-methylamino s-triazine
Amino di-(toluene sulfonyl hydrazino) s-triazine
Tri-(toluene sulfonyl hydrazino) s-triazine
(Xylene sulfonyl hydrazino) diamino s-triazine
Amino di-(xylene sulfonyl hydrazino) s-triazine
Tri-(xylene sulfonyl hydrazino) s-triazine
(Naphthalene sulfonyl hydrazino) diamino s-triazine
Amino di-(naphthalene sulfonyl hydrazino) s-triazine
Tri-(naphthalene sulfonyl hydrazino) s-triazine
(Toluene sulfonyl hydrazino) di-(methylamino) s-triazine
(Benzene sulfonyl hydrazino) dianilino s-triazine
(Xylene sulfonyl hydrazino) dianilino s-triazine
(Propylbenzene sulfonyl hydrazino) di-(pentylamino) s-triazine
(Propenylbenzene sulfonyl hydrazino) di-(isobutylamino) s-triazine
(Diethylbenzene sulfonyl hydrazino) ditoluido s-triazine
(Benzene sulfonyl hydrazino) di-(butenylamino) s-triazine
(Anthracene sulfonyl hydrazino) dixylidino s-triazine
(Toluene sulfonyl hydrazino) di-(naphthylamino) s-triazine
(Methyl ethyl benzene sulfonyl hydrazino) di-(phenethylamino) s-triazine
(Benzene sulfonyl hydrazino) di-(chloroanilino) s-triazine
(Toluene sulfonyl hydrazino) di-(bromotoluido) s-triazine
(Toluene sulfonyl hydrazino) di-(ethylanilino) s-triazine
(Toluene sulfonyl hydrazino) di-(cinnamylamino) s-triazine
2-benzene sulfonyl hydrazino) 4-chloromethylamino 6-methylamino s-triazine
(Benzene sulfonyl hydrazino) di-(chloroethylamino) s-triazine
Di-(toluene sulfonyl hydrazino) 6-methylamino s-triazine
2-benzenesulfonylhydrazino 4-toluenesulfonylhydrazino 6-ethylbenzenesulfonylhydrazino s-triazine
(Toluene sulfonyl hydrazino) di-(iodoanilino) s-triazine
(Chlorobenzene sulfonyl hydrazino) diamino s-triazine
(Bromotoluene sulfonyl hydrazino) diamino s-triazine
(Iodobenzene sulfonyl hydrazino) di-(methylamino) s-triazine
(Fluorobenzene sulfonyl hydrazino) di-(ethylamino) s-triazine
(Benzene sulfonyl hydrazino) di-(cyclohexylamino) s-triazine
(Toluene sulfonyl hydrazino) di-(cyclohexenylamino) s-triazine In a manner similar to that described above with particular reference to the arylsulfonylhydrazino- and haloarylsulfonylhydrazino-substituted symmetrical triazines (s-triazines), corresponding derivatives of the asymmetrical and vicinal triazines may be prepared.

What we claim as new and desire to secure by Letters Patent of the United States is:

1. Chemical compounds corresponding to the general formula $$(RHN)_{3-n}\left[\begin{array}{c}\text{C}\\\text{N}\quad\text{N}\\\text{-C}\quad\text{C-}\\\text{N}\end{array}\right](NH-NH-SO_2R')_n$$

where $n$ represents an integer and is at least 1 and not more than 3, R represents a member of the class consisting of hydrogen and monovalent hydrocarbon and halo-hydrocarbon radicals, and R' represents a member of the class consisting of aryl and halo-aryl radicals.

2. Chemical compounds as in claim 1 wherein R represents hydrogen.

3. Chemical compounds as in claim 1 wherein R' represents an aryl radical.

4. Chemical compounds as in claim 1 wherein R represents hydrogen and R' represents an aryl radical.

5. A mono- (aryl sulfonyl hydrazino) diamino s-triazine.

6. (Benzene sulfonyl hydrazino) diamino s-triazine.

7. A monoamino di- (aryl sulfonyl hydrazino) s-triazine.

8. A tri- (aryl sulfonyl hydrazino) s-triazine.

9. The method of preparing chemical compounds corresponding to the general formula $$(RHN)_{3-n}\left[\begin{array}{c}\text{C}\\\text{N}\quad\text{N}\\\text{-C}\quad\text{C-}\\\text{N}\end{array}\right](NH-NH-SO_2R')_n$$

where $n$ represents an integer and is at least 1 and not more than 3, R represents a member of the class consisting of hydrogen and monovalent hydrocarbon and halo-hydrocarbon radicals, and R' represents a member of the class consisting of aryl and halo-aryl radicals, said method comprising effecting reaction, in the presence of a hydrohalide acceptor, between (1) a compound corresponding to the general formula

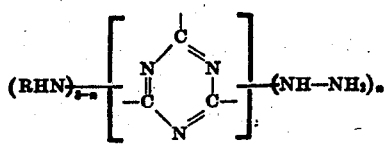

where $n$ and R have the meanings above given, and (2) a compound corresponding to the general formula

where X represents a halogen selected from the class consisting of chlorine, bromine and iodine, and $n$ and R' have the meanings above given.

10. A method as in claim 9 wherein the hydrohalide acceptor is a tertiary base.

11. A method as in claim 9 wherein the reaction is carried out in the presence of an anhydrous solvent which is inert to the other ingredients present in the reaction mass.

12. The method of preparing (benzene sulfonyl hydrazino) diamino s-triazine which comprises effecting reaction, in the presence of a hydrohalide acceptor, between approximately equimolecular proportions of hydrazino diamino s-triazine and benzene sulfonyl chloride.

13. A method as in claim 12 wherein the hydrohalide acceptor is pyridine and the reaction is carried out in the presence of an anhydrous solvent which is inert to the other ingredients present in the reaction mass.

14. The method of preparing (benzene sulfonyl hydrazino) diamino s-triazine which comprises effecting reaction, in the absence of applied heat, between hydrazino diamino s-triazine and benzene sulfonyl chloride while admixed with pyridine, said hydrazino diamino s-triazine, benzene sulfonyl chloride and pyridine being employed in approximately equimolecular proportions, and said benzene sulfonyl chloride being dissolved in ether before being brought into contact with the hydrazino diamino s-triazine and pyridine, and isolating and purifying the (benzene sulfonyl hydrazino) diamino s-triazine thereby produced.

15. The method of preparing (benzene sulfonyl hydrazino) diamino s-triazine which comprises dissolving benzene sulfonyl chloride in ether, adding the resulting solution slowly to a mixture of hydrazino diamino s-triazine and pyridine while stirring vigorously and cooling, said hydrazino diamino s-triazine, benzene sulfonyl chloride and pyridine being employed in approximately equimolecular proportions, and, after a reaction period of the order of 70 hours at room temperature, filtering off the resulting precipitate comprising (benzene sulfonyl hydrazino) diamino s-triazine, washing the said precipitate with ether, and drying the washed precipitate.

GAETANO F. D'ALELIO.
JAMES W. UNDERWOOD.